June 11, 1974   N. KAFES   3,816,599
HYDROGEN CHLORIDE RECOVERY
Filed Nov. 16, 1971
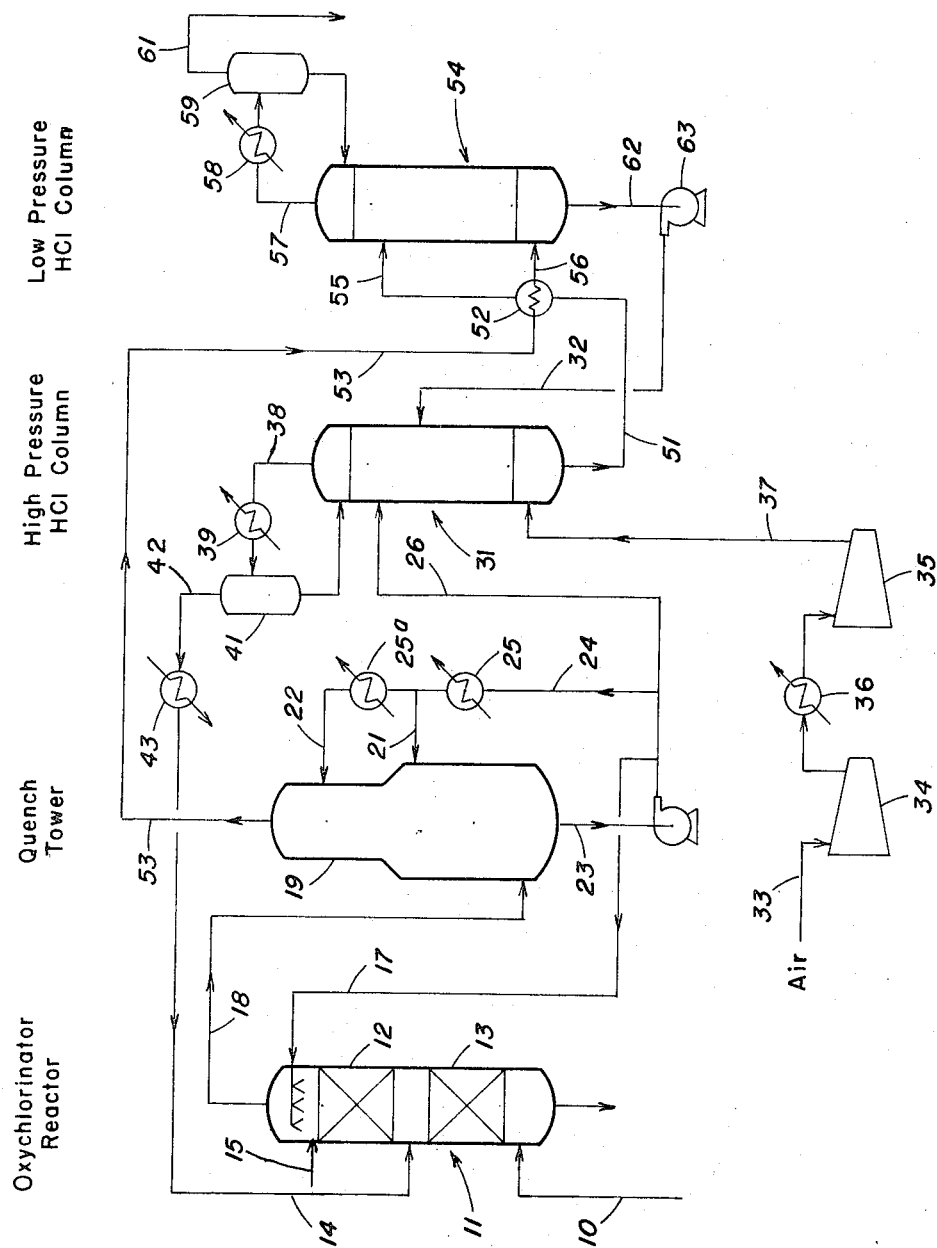
INVENTOR.
Nicholas Kafes
BY
Marn & Jangarathis
ATTORNEYS

United States Patent Office 3,816,599
Patented June 11, 1974

3,816,599
HYDROGEN CHLORIDE RECOVERY
Nicholas Kafes, Astoria, N.Y., assignor to The
Lummus Company, Bloomfield, N.J.
Filed Nov. 16, 1971, Ser. No. 199,234
Int. Cl. C01b 7/08
U.S. Cl. 423—488                                10 Claims

ABSTRACT OF THE DISCLOSURE

An off-gas from an oxychlorinator containing water vapor and hydrogen chloride is subjected to high pressure-low pressure azeotropic distillation to recover hydrogen chloride therefrom. An oxygen-containing gas is used as a stripping medium in the high pressure column and the hydrogen chloride of the off-gas is recovered with the oxygen-containing gas for introduction into the oxychlorinator.

---

This invention relates to hydrogen chloride recovery and more particularly to recovery of hydrogen chloride from an aqueous solution thereof.

There are numerous processes in which hydrogen chloride must be recovered from an aqueous solution thereof, and such recovery is generally very costly. One such process is an oxychlorination process.

Oxychlorination reaction using hydrogen chloride and oxygen are well known in the art. One type of oxychlorination reaction involves contacting a mixture of a multivalent metal chloride in both its higher and lower valence state, such as a mixture of cuprous and cupric chloride, either as an unsupported melt or supported on a suitable support, with hydrogen chloride and a molecular oxygen-containing gas to increase the content of the higher valent metal chloride, e.g., cupric chloride. Representative examples of such processes are disclosed in U.S. Pat. 2,418,931; U.S. Pat. 2,407,828; U.S. Pat. 3,548,016; Canadian Pat. 705,925; and Canadian Pat. 711,287.

Another type of oxychlorination reaction involves contacting hydrogen chloride and oxygen with a hydrocarbon or chlorinated hydrocarbon, generally in the presence of a suitable catalyst, to produce chlorinated hydrocarbons, as disclosed for example, in U.S. Pat. 3,256,352 and British Pat. 998,689.

In most cases, the hydrogen chloride introduced into the oxychlorination is not completely reacted, and in such cases, the overall economics of the process may be dependent upon the effective recovery of any unreacted hydrogen chloride.

Accordingly, an object of this invention is to provide for improved recovery of hydrogen chloride.

Another object of this invention is to provide for improved recovery of hydrogen chloride from aqueous solution thereof.

A further object of this invention is to provide for improved recovery of hydrogen chloride from an aqueous hydrogen chloride off-gas from an oxychlorination reactor.

These and other objects of the invention should be more readily apparent from the following detailed description thereof when read with reference to the accompanying drawing wherein;

The drawing is a simplified schematic flow diagram of an embodiment of the present invention.

The objects of this invention are broadly accomplished by introducing an aqueous hydrogen chloride solution into an azeotropic distillation zone including first and second towers, the first tower being operated at a temperature and pressure to produce an essentially water-free hydrogen chloride overhead, and the second tower being operated at a temperature and pressure to produce an essentially hydrogen chloride - free water overhead. A molecular oxygen - containing gas to be used in an oxychlorination reactor is introduced into the first column, as a stripping gas, and overhead from the first tower comprised of the oxygen - containing gas and essentially water-free hydrogen chloride is introduced into the oxychlorination reactor. In this manner, the oxygen requirements for the oxychlorination are effectively utilized to provide stripping requirements for the azeotropic distillation of aqueous hydrogen chloride, and the recovered hydrogen chloride is effectively utilized, along with the oxygen, in an oxychlorination reactor.

In general, the aqueous hydrogen chloride employed as net feed to the azeotropic distillation is recovered from an off-gas from the oxychlorination reactor, whereby hydrogen chloride recovery is effectively integrated into the overall oxychlorination.

In accordance with a preferred procedure, the portion of the off-gas remaining after separation of hydrogen chloride and water is used as a stripping gas in the low pressure column. In its most preferred aspects, the high pressure and low pressure distillation columns are designed and operated in a manner such that the stripping requirements therefor are matched with the air requirements for the oxychlorinator, whereby there is no necessity to provide stripping requirements from an extraneous source.

The oxychlorination reactions to which the present invention is applicable are of several types and include: (1) reaction between molecular oxygen, hydrogen chloride and a salt mixture of the higher and lower valent forms of a multivalent metal chloride to enrich the high valent metal chloride content of the mixture; (2) reaction between molecular oxygen, hydrogen chloride and a hydrocarbon or partially chlorinated hydrocarbon, generally a lower (1–4 carbon atoms) aliphatic hydrocarbon or partially chlorinated lower aliphatic hydrocarbon to produce a chlorinated hydrocarbon; (3) reaction between hydrogen chloride and oxygen to produce chlorine, (generally referred to as a Deacon reaction, but for the purposes of this invention this reaction is considered an oxychlorination); (4) reaction between an oxychloride of a multivalent metal and hydrogen chloride to produce the higher valent metal chloride; and (5) reaction between an oxychloride of a multivalent metal, hydrogen chloride and a hydrocarbon or partially chlorinated hydrocarbon to produce a chlorinated hydrocarbon. These reactions all result in the production of a reaction effluent which includes water as reaction product, and which also includes hydrogen chloride as unreacted feed; therefore, the teachings of the present invention are applicable to such reactions. These reactions are known in the art, and are represented by the following equations, using ethylene as a representative feed and copper chlorides as a representative multivalent metal chloride:

(1) $2HCl + \frac{1}{2}O_2 + 2CuCl \quad 2CuCl_2 + H_2O$
(2) $C_2H_4 + \frac{1}{2}O_2 + HCl \quad C_2H_3Cl + H_2O$
(3) $2HCl + \frac{1}{2}O_2 \quad Cl_2 + H_2O$
(4) $CuO \cdot CuCl_2 + 2HCl \quad 2CuCl_2 + H_2O$
(5) $CuO \cdot CuCl_2 + HCl + C_2H_4 \quad C_2H_3Cl + H_2O + 2CuCl$ The reactions represented by equations (2) and (3) are effected in the presence of a suitable catalyst; i.e., a Deacon or oxychlorination type catalyst, as known in the art; generally reaction temperatures from about 500° F. to about 1200° F.

The chloride and/or oxychloride of a multivalent metal, i.e., a metal having more than one positive valence state, (Equations 1, 4 and 5) is generally a mixture of the chlorides of either manganese, iron, copper, cobalt or chromium, preferably copper. If the mixture is to be employed as a melt, the mixture may also include a metal salt melting point depressant which is non-volatile and resistant to oxygen at the process conditions, such as a chloride of a univalent metal; i.e., a metal having only one positive valence state, to provide a salt mixture having a reduced melting point. The univalent metal chlorides are preferably alkali metal chlorides, such as potassium and lithium chloride, in particular, but it is to be understood that other metal chlorides and mixtures thereof, such as the heavy metal chlorides; i.e., heavier than copper, of Groups I, II, III and IV of the Periodic Table; e.g., zinc, silver and thallium chloride, may also be employed. A preferred composition is formed from copper chlorides and potassium chloride comprising from about 20% to about 40%, by weight, of the composition, with the remainder being copper chlorides. These multivalent metal chlorides are also suitable catalysts and/or reactants for the hydrocarbon oxychlorination, as defined in equation (2).

The present invention will be further described with respect to an embodiment thereof illustrated in the accompanying drawing, but it is to be understood that the scope of the invention is not to be limited thereby. Although the embodiment is directed to the oxychlorination of a salt mixture, the teachings thereof are equally applicable to the oxychlorination of a hydrocarbon or chlorinated hydrocarbon.

Referring to the drawing a hydrogen chloride-containing gas in line 10 is introduced into a salt oxychlorination reactor 11, containing packed sections 12 and 13 to increase vapor-liquid contact. An oxygen-containing gas, such as air, also including recovered hydrogen chloride, obtained as hereinafter described, is introduced into reactor 11 through line 14.

A molten salt mixture of, for example, cuprous and cupric chloride, and also potassium chloride, as a melting point depressant, is introduced into the top of reactor 11 through line 15 and countercurrently contacts the ascending gas, resulting in oxychlorination to enrich the content of cupric chloride in the melt. The reactor 11 is operated as known in the art generally at a temperature from about 600° F. to about 900° F. and at a pressure from about 1–10 atm. A cupric chloride-enriched melt, and further containing copper oxychloride in the case where the amount of oxygen introduced into the reactor stoichiometrically exceeds the amount of hydrogen chloride, is withdrawn from the bottom of reactor 11 for use in subsequent processing steps which form no part of the present invention.

An off-gas, containing unreacted hydrogen chloride, any components introduced with the hydrogen chloride and components of the oxygen-containing gas such as nitrogen and unreacted oxygen, if any, is contacted in the top of reactor 11 with a spray of quench liquid, such as aqueous hydrogen chloride, introduced through line 17 to cool the off-gas and condense and separate any entrained molten salt.

The cooled gaseous stream, now free of any entrained molten salt and containing vaporized quench liquid, withdrawn from reactor 11 through line 18, is introduced into the bottom of a direct contact quench tower 19, of a type known in the art. In quench tower 19, the gaseous stream is cooled by direct contact with a quench liquid introduced through lines 21 and 22 to a temperature at which essentially all of the hydrogen chloride and water vapor is condensed from the gaseous stream, generally a temperature less than about 105° F. and preferably a temperature from about 55° F. to about 90° F.

The condensed aqueous hydrogen chloride is withdrawn from tower 19 through line 23 and a first portion thereof passed through line 17 as the quench liquid for reactor 11. A second portion of the condensed aqueous hydrogen chloride is passed through line 24, including suitable coolers 25 and 25a, for introduction into the quench tower 19 through lines 21 and 22. The quench liquid in line 24 is cooled to the temperature required to meet the cooling requirements of tower 19. In general, the quench liquid is indirectly cooled in cooler 25 to a temperature from about 125° F. to about 135° F., and then further indirectly cooled in cooler 25a to a temperature from about 50° F. to about 100° F. It is to be understood, however, that the precise cooler temperature is dependent upon the concentration of hydrogen chloride in the quench liquid.

A third portion of the aqueous hydrogen chloride in line 23 is passed through line 26 for introduction into an azeotropic distillation system which includes high pressure-low pressure azeotropic distillation columns.

The aqueous hydrogen chloride in the off-gas from the salt oxychlorinator is recovered by high pressure-low pressure azeotropic distillation to take advantage of the pressure dependency of the hydrogen chloride water azeotrope. The high pressure column is operated at conditions at which essentially water-free hydrogen chloride is recovered as overhead, with a hydrogen chloride-water azeotrope being recovered as bottoms. The hydrogen chloride-water azeotrope bottoms are then fed to a low pressure column which is operated at conditions which permits recovery of an essentially hydrogen chloride-free water vapor overhead from the azeotrope feed, with the azeotrope bottoms from the low pressure column being recycled to the high pressure column. The pressure dependency of such homogeneous azeotropes is known in the art and, therefore, no detailed explanation thereof is deemed necessary for a full understanding of the invention.

The operating pressure levels of the two columns determines the azeotropic compositions recovered as bottoms from the columns. Accordingly, once the pressure levels of the columns have been fixed (which also fixes the bottoms compositions of the columns) the column into which the aqueous hydrogen chloride is fed; i.e., the net feed to the azeotropic distillation system, is determined by the hydrogen chloride concentration. If the net aqueous hydrogen chloride feed has a hydrogen chloride concentration greater than the hydrogen chloride concentration of the bottoms composition recovered from the high pressure column, then the net feed is introduced into the high pressure column. If the net feed has a hydrogen chloride concentration less than the hydrogen chloride concentration of the bottoms composition recovered from the high pressure column, then the net feed is introduced into the low pressure column. The embodiment illustrated in the drawing is directed to a processing scheme in which the aqueous hydrogen chloride net feed in line 26 has a hydrogen chloride concentration greater than the hydrogen chloride concentration of the bottoms recovered from the high pressure column 31.

The aqueous hydrogen chloride in line 26 is introduced into the high pressure tower 31 along with an aqueous hydrogen chloride stream in line 32, recovered from the low pressure column, as hereinafter described. An oxygen-containing gas, such as air, in line 33 is passed through a pair of centrifugal compressors 34 and 35, having a cooler 36 therebetween, to provide a gas temperature and pressure suitable for the stripping requirements of the column 31, generally a temperature from about 250° F. to about 350° F. and an absolute pressure from about 5 atm. to about 8 atm. The air in line 37 is introduced into the bottom of column 31.

The column 31 is operated at temperatures and pressures to provide a hydrogen chloride overhead which is essentially free of water, and such overhead temperatures generally range from about 110° F. to about 170° F., preferably from about 135° F. to about 145° F., and such column pressures from about 4.0 atm. to about 7.0 atm., preferably from about 5.5 atm. to about 6.5 atm. The bottoms recovered from tower 31 is an aqueous hydrogen chloride bottoms which is the water-hydrogen chloride azeotropic composition at the prevailing pressure generally from about 14% to about 17%, by weight, of hydrogen chloride, such azeotropic compositions corresponding to bottoms temperatures from about 340° F. to about 295° F., respectively.

An overhead comprised of the oxygen-containing gas introduced into tower 31 through line 37, now containing essentially water-free hydrogen chloride, recovered from the aqueous hydrogen chloride streams introduced into tower 31 through lines 26 and 32, is withdrawn from tower 31 through line 38 and passed through the reflux condenser 39 and accumulator 41 of the reflux section of the tower 31 designed to meet the reflux requirements of tower 31. The net overhead from tower 31 in line 42 is passed through heat exchanger 43 wherein the temperature of the overhead is adjusted to the temperature required in reactor 11. The gaseous stream from heat exchanger 43 in line 14, containing the oxygen-containing gas and recovered hydrogen chloride, is introduced into reactor 11 for reaction with the molten salt, as hereinabove described.

The bottoms from tower 31 in line 51 is depressured to jump the azeotropic limitation, and passed through heat exchanger 52 wherein the bottoms is cooled by indirect heat transfer with the gaseous overhead stream withdrawn from quench tower 19 through line 53. The gaseous overhead stream is essentially comprised of the components of the oxygen-containing gas used in the process, generally nitrogen and some oxygen and any other unreacted components introduced into reactor 11 with the hydrogen chloride stream in line 10, such as, for example, carbon oxides, and this stream is employed as a stripping gas in a low pressure distillation column 54 for recovering an essentially hydrogen chloride-free overhead. In addition, the use of the overhead in line 53 as a stripping gas in column 54 has the added advantage of further recovering any remaining hydrogen chloride therefrom. The cooled bottoms from tower 31 in line 55 is introduced into the top of column 54 and the heated stripping gas in line 56 is introduced into the bottom of column 54. Column 54 is operated at temperatures and pressures to provide an essentially hydrogen chloride-free water vapor overhead which is the water vapor produced during the salt oxychlorination in reactor 11. The column 54 is generally operated at overhead temperatures from about 170° F. to about 150° F., preferably at about 160° F. and column pressures from about 1.1 atm. to about 1.7 atm.

An essentially hydrogen chloride-free water vapor overhead, including the components of the gas introduced through line 56, is withdrawn from tower 54 through line 57 and passed through the condenser 58 and reflux accomulator 59 of the reflux section of column 54 to provide the reflux requirements therefor. The net overhead is recovered in line 62 and, if required, may be suitably washed, for example, with water, to remove any trace of hydrogen chloride before release to the atmosphere.

A bottoms, generally comprising from about 19% to about 20%, by weight, of hydrogen chloride (the water-hydrogen chloride azeotropic composition at the prevailing pressure in tower 54), is withdrawn from tower 54 through line 62 and pressurized in pump 63 for introduction into column 31 through line 32. The bottoms temperatures in tower 54 corresponding to such azeotropes are from about 255° F. to about 230° F., respectively.

Thus, in accordance with the hereinabove described embodiment, essentially all of the hydrogen chloride introduced into the system through line 10 is recovered by the molten salt in reactor 11, and the gas is vented to the atmosphere contain essentially no hydrogen chloride. In addition, the azeotropic distillation columns are designed and operated in a manner such that the air requirements for the oxychlorination provide the stripping requirements for the azeotropic distillation.

It should be readily apparent that numerous modifications and variations of the hereinabove described embodiment are possible within the spirit and scope of the invention. Thus, for example, although the invention has been particularly described with respect to the use of a direct contact quench tower for cooling the tower overhead, other cooling means may be employed, such as, for example, an indirect heat exchanger in combination with a vapor-liquid separator.

Similarly, the stripping gas requirements of column 54 may be provided by other than the gas from tower 19, for example, by the use of steam, but the use of the overhead from tower 19 is preferred in that not only are utilities requirements reduced, but remaining amounts of hydrogen chloride, if any, are effectively removed from this gas.

It should also be apparent that although the embodiment has been particularly described with respect to the preferred use of the multivalent metal chlorides as an unsupported molten mixture, the present invention is also applicable to those processes which utilize supported multivalent metal halides, as known in the art; e.g., as disclosed in U.S. Pat. 2,418,931 and U.S. Pat. 2,407,828.

It should further be apparent that salt oxychlorination including the hydrogen chloride recovery of the present invention may be utiilzed in any of a wide variety of processes requiring such salt oxychlorination, such as for example, the processes disclosed in U.S. Pat. 2,418,931; U.S. Pat. 2,407,828; U.S. Pat. 3,548,016; Canadian Pat. 705,925 and Canadian Pat. 711,287.

Similarly, the hydrogen chloride recovery process of the invention is equally applicable to those processes in which a hydrocarbon or chlorinated hydrocarbon is oxychlorinated with hydrogen chloride and molecular oxygen; e.g., as disclosed in British Pat. 998,689; British Pat. 934,329; U.S. Pat. 3,256,352; and U.S. Pat. 3,557,229.

The hydrogen chloride gas used as the net feed to the oxychlorination reactor may be either a fresh hydrogen chloride feed or a recycle hydrogen chloride obtained from another reactor employed in an overall process. It should also be apparent that the hydrogen chloride gas introduced into the oxychlorinator, or an additional feed, may contain other components, such as hydrocarbons, carbon oxides, chlorine, water vapor; e.g., the hydrogen chloride gas may be a combustion effluent as disclosed, for example, in U.S. Pat. 3,548,016 in which case the off-gas from the oxychlorinator will contain other components, such as carbon oxides.

The above modifications and numerous others should be apparent to those skilled in the art from the teachings herein.

The invention will be further described with respect to the following example which further illustrates the invention, but it is to be understood that the scope of the invention is not to be limited thereby.

EXAMPLE

The following is illustrative of operating conditions in accordance with the present invention:

TABLE 1

| | Comp. air | H.P. column ovhd. (14) | Net oxidizer effluent (18) | Quench tower water feed | Quench tower ovhd. (53) | L.P. column ovhd. (57) | Quench tower bottoms (26) | H.P. column bottoms (51) | L.P. column bottoms (62) |
|---|---|---|---|---|---|---|---|---|---|
| $CO_2$ | | | 38 | | 38 | 38 | | | |
| HCl | | 120 | 120 | | | | 120 | 250 | 250 |
| $H_2O$ | 43 | 16 | 663 | 100 | 55 | 790 | 708 | 2,755 | 2,020 |
| $N_2$ | 1,400 | 1,400 | 1,400 | | 1,400 | 1,400 | | | |
| $O_2$ | 371 | 371 | 9 | | 9 | 9 | | | |
| Total | 1,814 | 1,907 | 2,230 | 100 | 1,502 | 2,237 | 828 | 3,005 | 2,270 |

Note.—All quantities in lb. mols/hr.

PRESSURES (Atmosphere, absolute):
- Quench tower _____ 3.7
- High pressure column _____ 5.8
- Low pressure column _____ 1.4
- Air compressor discharge _____ 6.3

TEMPERATURE (° F.):
- Quench tower—Overhead _____ 85
- Bottoms _____ 180
- High pressure column:
  - Overhead _____ 140
  - Bottoms _____ 315
- Low pressure column:
  - Overhead _____ 160
  - Bottoms _____ 240

CONCENTRATION (Wt. percent HCl):
- Quench tower bottoms _____ 25.6
- High pressure column:
  - Bottoms _____ 15.5
- Low pressure column:
  - Bottoms _____ 20.0

The system of the present invention is highly advantageous in that essentially all of the chlorine values introduced into the system as hydrogen chloride is recovered, thereby reducing the costs of an overall process requiring an oxychlorination step. Furthermore, the process of the present invention effectively reduces pollution by preventing release of hydrogen chloride containing off-gas into the atmosphere. In addition, the above may be economically achieved by utilizing the oxygen-containing gas required in the oxychlorination to provide the stripping requirements of the distillation. These and other advantages should be apparent to those skilled in the art from the teachings herein.

Numerous modifications and variations of the present invention are possible in light of the above teachings and, therefore, within the scope of the appended claims the invention may be practised in a manner other than as particularly described.

What is claimed is:

1. In combination with hydrogen chloride oxychlorination a process for recovering hydrogen chloride from an aqueous hydrogen chloride solution comprising:
   introducing an aqueous solution of hydrogen chloride into an azeotropic distillation zone comprising first and second columns, said first column being operated at a temperature and pressure to produce an essentially water-free hydrogen chloride overhead and said second column being operated at a temperature and pressure to produce an essentially hydrogen chloride free water overhead, the pressure in said second column being lower than the pressure in the first column, said aqueous solution of hydrogen chloride being introduced into one of said first and second columns; introducing bottoms from the first column into the second column; introducing bottoms from the second column into the first column; introducing into the first column as a stripping gas, a molecular oxygen-containing gas; withdrawing as overhead from the first column said oxygen-containing gas and essentially water-free hydrogen chloride; and introducing said overhead into a hydrogen chloride oxychlorination reaction zone.

2. The process of claim 1 wherein said aqueous hydogen chloride is introduced into the second column.

3. The process of claim 1 wherein the aqueous hydrogen chloride is introduced into the first column.

4. The process of claim 1 wherein said oxygen-containing gas is introduced into the first column at a temperature from about 250° F. to about 350° F. and an absolute pressure from about 5 atm. to about 8 atm.

5. The process of claim 4 wherein said first column is operated at a column pressure from about 4 to about 7 atm., an overhead tempearture from about 110° F. to about 170° F. and a bottoms temperature from about 295° F. to about 340° F. and said second column is operated at a column pressure from about 1.1 to about 1.5 atm., an overhead temperature from about 150° F. to about 170° F. and a bottoms temperature from about 230° F. to about 255° F.

6. In a combination with hydrogen chloride oxychlorination, a hydrogen chloride recovery process, comprising:
   introducing hydrogen chloride, and a mixture of recovered hydrogen chloride and a molecular oxygen-containing gas into a hydrogen chloride oxychlorination reaction zone; withdrawing a gaseous stream comprising water vapor and hydrogen chloride from said oxychlorination reaction zone; separating an aqueous solution of hydrogen chloride from said gaseous stream; introducing at least a portion of the aqueous solution of hydrogen chloride into an azeotropic distillation zone comprising first and second columns, said first column being operated at a temperature and pressure to produce an essentially water-free hydrogen chloride overhead and said second column being operated at a temperature and pressure to produce an essentially hydrogen chloride-free water overhead, said second column being operated at a pressure lower than the pressure in the first column, said aqueous solution of hydrogen chloride being introduced into one of said first and second columns; introducing bottoms from the first column into the second column; introducing bottoms from the second column into the first column; introducing into the first column as a stripping gas, a molecular oxygen-containing gas; withdrawing as overhead from the first column a mixture of said oxygen-containing gas and recovered essentially water-free hydrogen chloride; and passing said mixture to the oxychlorination reaction zone.

7. The process of claim 6 wherein the oxygen-containing gas is air.

8. The process of claim 7 and further comprising: introducing the gaseous stream from which the aqueous hydrogen chloride has been separated into the second column as a stripping gas.

9. The process of claim 8 wherein said oxygen-containing gas is introduced into the first column at a temperature from about 250° F. to about 350° F. and an absolute pressure from about 5 atm. to about 8 atm.

10. The process of claim 9 wherein said first column is operated at a column pressure from about 4 to about 7 atm., an overhead temperature from about 110° F. to about 170° F. and a bottoms temperature from about 295°

F. to about 340° F. and said second column is operated at a column pressure from about 1.1 to about 1.5 atm., an overhead temperature from about 150° F. to about 170° F. and a bottoms temperature from about 230° F. to about 255° F.

References Cited
UNITED STATES PATENTS

| | | | |
|---|---|---|---|
| 1,897,996 | 2/1933 | Barstow et al. | 423—488 |
| 2,299,427 | 10/1942 | Rosentein | 423—502 |
| 2,558,011 | 6/1951 | Sprauer et al. | 55—71 UX |
| 2,746,844 | 5/1956 | Johnson et al. | 423—502 |
| 3,159,455 | 12/1964 | Skaperdas et al. | 423—502 |
| 3,233,978 | 2/1966 | Alkemade | 423—488 |
| 3,360,483 | 12/1967 | Diamond et al. | 423—502 X |
| 3,387,430 | 6/1968 | Savardi, Jr. | 423—481 X |
| 3,394,056 | 7/1968 | Nadler et al. | 423—481 X |
| 3,414,377 | 12/1968 | Bauwens et al. | 423—502 |
| 3,617,209 | 11/1971 | Massonne et al. | 55—71 X |

OSCAR R. VERTIZ, Primary Examiner

B. E. HEARN, Assistant Examiner

U.S. Cl. X.R.

423—502; 203—12, 80